United States Patent [19]
Chang

[11] Patent Number: 5,786,775
[45] Date of Patent: *Jul. 28, 1998

[54] KEYBOARD STRUCTURE OF A PORTABLE COMPUTER

[75] Inventor: Chih-Ching Chang, Taipei, Taiwan

[73] Assignee: Compal Electronics, Inc., Taipei, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 816,248

[22] Filed: Mar. 13, 1997

[51] Int. Cl.⁶ ............................................ H05K 7/16
[52] U.S. Cl. ........................... 341/22; 361/680; 400/682
[58] Field of Search ................... 341/20, 22; 361/683, 361/380, 679; 400/682; 364/708.1

[56] References Cited

U.S. PATENT DOCUMENTS

| | | | |
|---|---|---|---|
| 5,168,427 | 12/1992 | Clancy | 361/680 |
| 5,239,444 | 8/1993 | Sasaki | 361/683 |
| 5,490,036 | 2/1996 | Lin | 361/680 |
| 5,596,980 | 1/1997 | Manser | 361/680 |
| 5,629,832 | 5/1997 | Sellers | 361/680 |

*Primary Examiner*—Jeffery Hofsass
*Assistant Examiner*—Albert K. Wong
*Attorney, Agent, or Firm*—Pro-Techtor International

[57] ABSTRACT

A keyboard structure of a portable computer, in which the keyboard is disposed on a pad board having supporting cranks pivotally disposed on two sides thereof. A torque spring is disposed at the pivot portion between the supporting crank and the pad board for rotating the supporting crank to lift the pad board in a natural state. The base seat is formed with slide channels corresponding to the supporting cranks for the free ends thereof to slidably extend in. When the pad board is released from the engaging force, the supporting crank suffers the torque of the torque spring to slide with in the slide channel of the base seat and gradually push the rear side of the pad board to pivot upward about the pivot member of the front side. Therefore, the keyboard rested on the pad board is inclined by a certain angle to facilitate the operation. The keyboard can be divided into two keyboard divisions which can be stretched apart to meet the configuration of human hands.

7 Claims, 6 Drawing Sheets

KEYBOARD STRUCTURE OF A PORTABLE COMPUTER

BACKGROUND OF THE INVENTION

The present invention relates to a a keyboard structure of a portable computer, in which the keyboard is disposed on a pad board. The front, edge of the pad board is pivotally connected with the top face of the base seat by pivot members. The pad board has supporting cranks pivotally disposed on two sides thereof. A torque spring is disposed at the pivot portion between the supporting crank and the pad board for rotating the supporting crank to lift the pad board in a natural state. The base seat is formed with slide channels corresponding to the supporting cranks for the free ends thereof to slidably extend in. When the pad board is released from the engaging force, the supporting crank suffers the torque of the torque spring to slide within the slide channel of the base seat and gradually push the rear side of the pad board to pivot upward. The keyboard can be divided into two keyboard divisions which can be stretched apart to meet the configuration of human hands.

SUMMARY OF THE INVENTION

It is a primary object of the present invention to provide a keyboard structure of a portable computer, in which the keyboard is disposed on a pad board having supporting cranks pivotally disposed on two sides thereof. A torque spring is disposed at the pivot portion between the supporting crank and the pad board for rotating the supporting crank to lift the pad board in a natural state. The base seat is formed with slide channels corresponding to the supporting cranks for the free ends thereof to slidably extend in. When the pad board is released from the engaging force, the supporting crank suffers the torque of the torque spring to slide within the slide channel of the base seat and gradually push the rear side of the pad board to pivot upward about the pivot member of the front side. Therefore, the keyboard rested on the pad board is inclined by a certain angle to facilitate the operation.

It is a further object of the present invention to provide the above keyboard structure in which a resilient engaging plate is disposed on the base seat near the front edge of the pad board. The engaging plate is disposed with an engaging projection for engaging with the pad board and making the pad board and keyboard attached to the base seat. A pushing section extends from upper side of the engaging projection for easily pushing and disengaging the pad board and keyboard from the base seat in a stretchable state.

It is still a further object of the present invention to provide the above keyboard structure in which the keyboard is rested on the pad board without any other structure therebetween. Therefore, the keyboard can cooperate with other device to enhance its function.

For example, the keyboard can be divided into two keyboard divisions which can be pivoted and stretched apart about a pivot center to meet the configuration of human hands.

The present invention can be best understood through the following description and accompanying drawings, wherein:

DETAILED DESCRIPTION OF THE PREFERRED EMBODIMENT

Figure 1:
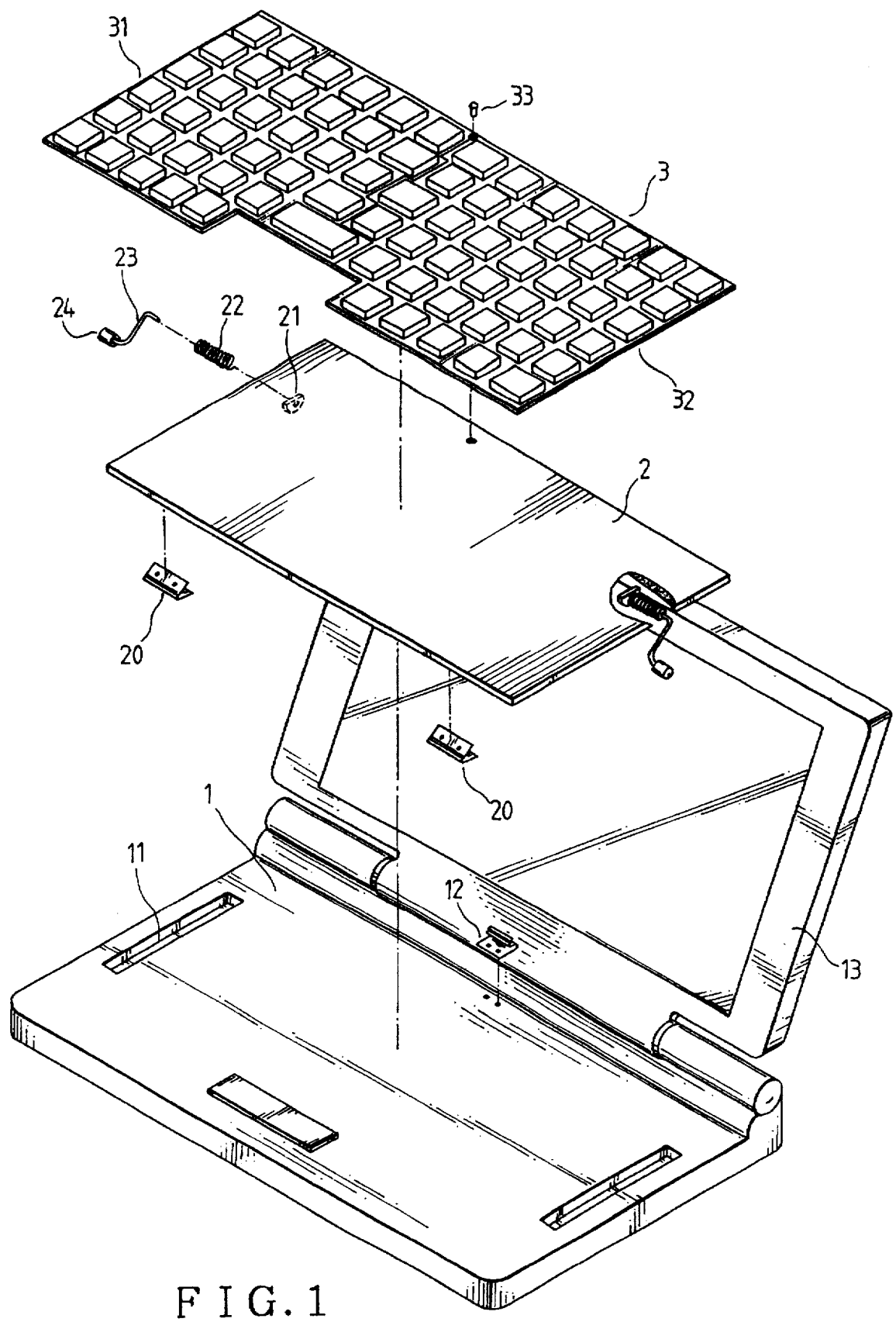
FIG. 1 is a perspective exploded view of the present invention.

Please refer to FIG. 1. The present invention includes a base seat 1, a pad board 2 and a keyboard 3. Two sides of the base seat 1 are disposed with slide channels 11. A resilient engaging plate 12 is secured on one side between the slide channels 11. The engaging plate 12 has an upward bent engaging projection 121. A pushing section 122 inclinedly extends from upper side of the engaging projection 121. A screen 13 is pivotally disposed beside the engaging plate 12. Pivot members 20 are disposed on front side of bottom face of the pad board 2. Two crank seats 21 are disposed on two sides of bottom face of the pad board 2. A supporting crank 23 is fitted with a torque spring 22 and then pivotally fitted with each crank seat 21. A guide wheel 24 is disposed at the free end of the supporting crank 23. The keyboard 3 is retained on the pad board 2.

Figure 2:
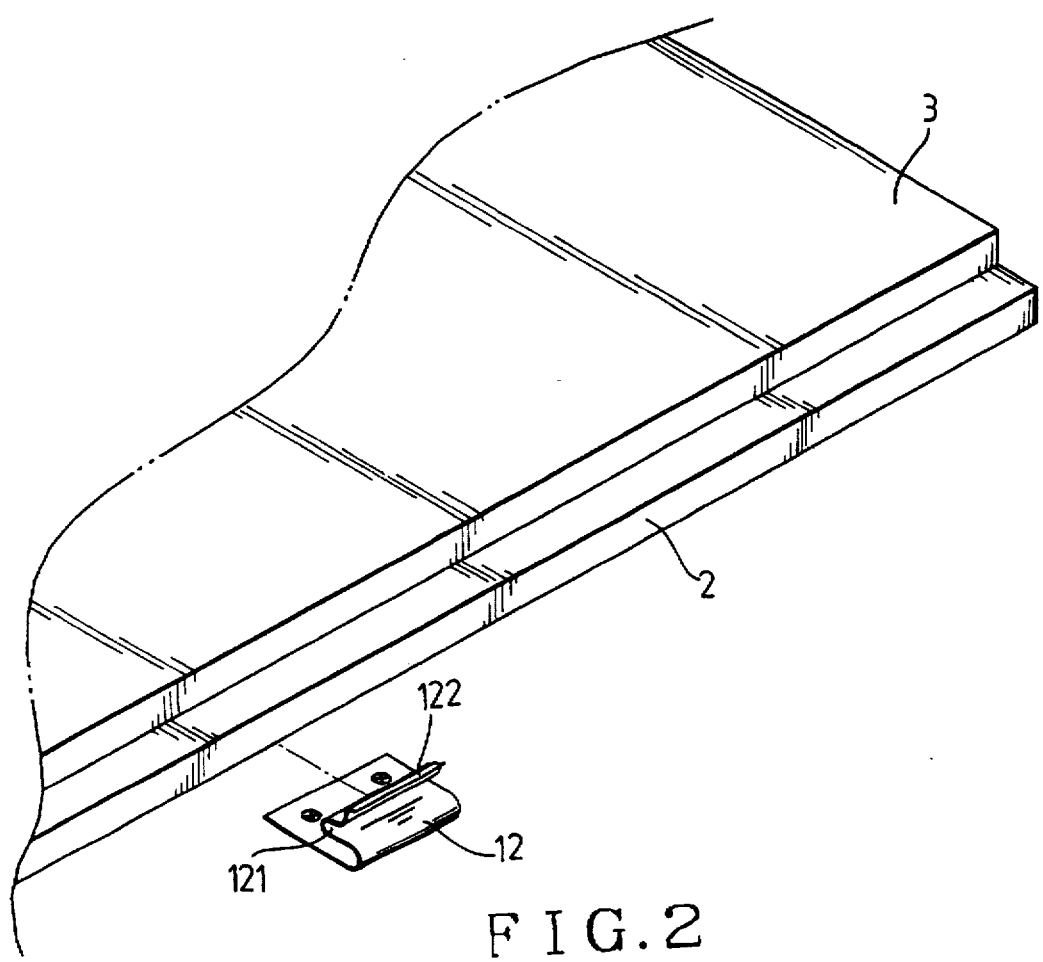
FIG. 2 shows the relationship between the engaging plate and the pad board of the present invention.
Figure 3:
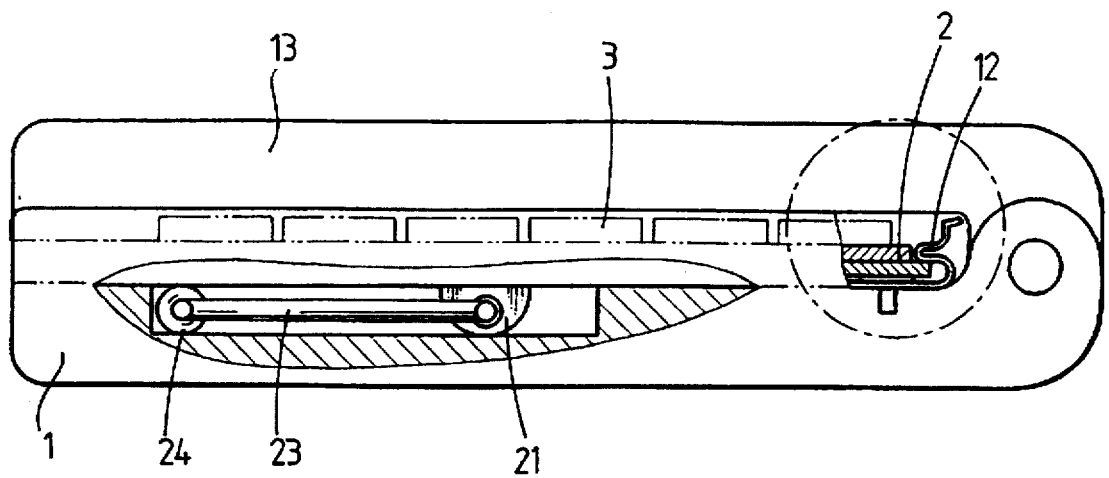
FIG. 3 is a sectional view showing the present invention in a collected state.
Figure 3A:
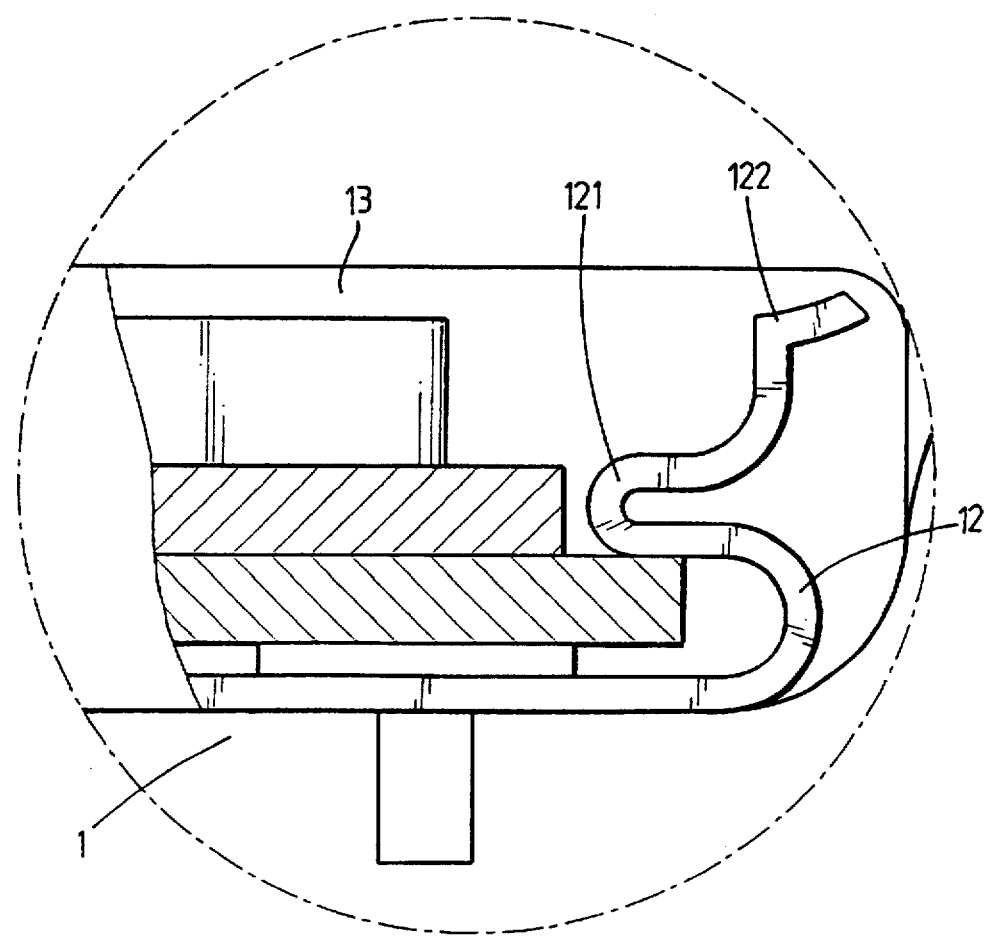
Figure 4:
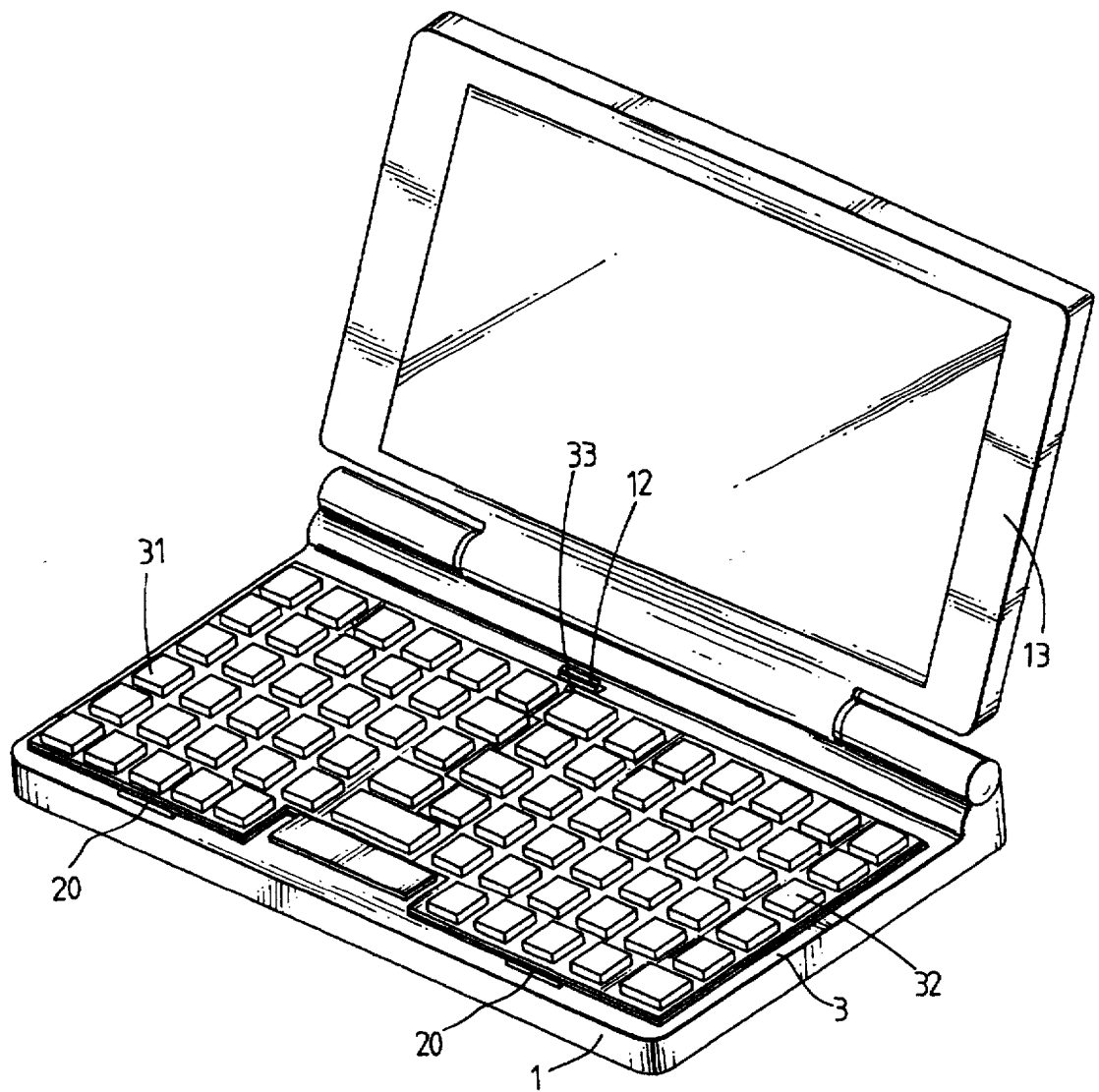
FIG. 4 is a perspective view showing the appearance of the present invention.

Referring to FIGS. 2, 3 and 4, when collected, the guide wheel 24 is slidably placed in the slide channel 11 and the engaging projection 121 of the engaging plate 12 is inserted above the pad board 2, whereby the pad board 2 is engaged and attached to the base seat 1.

Figure 5:
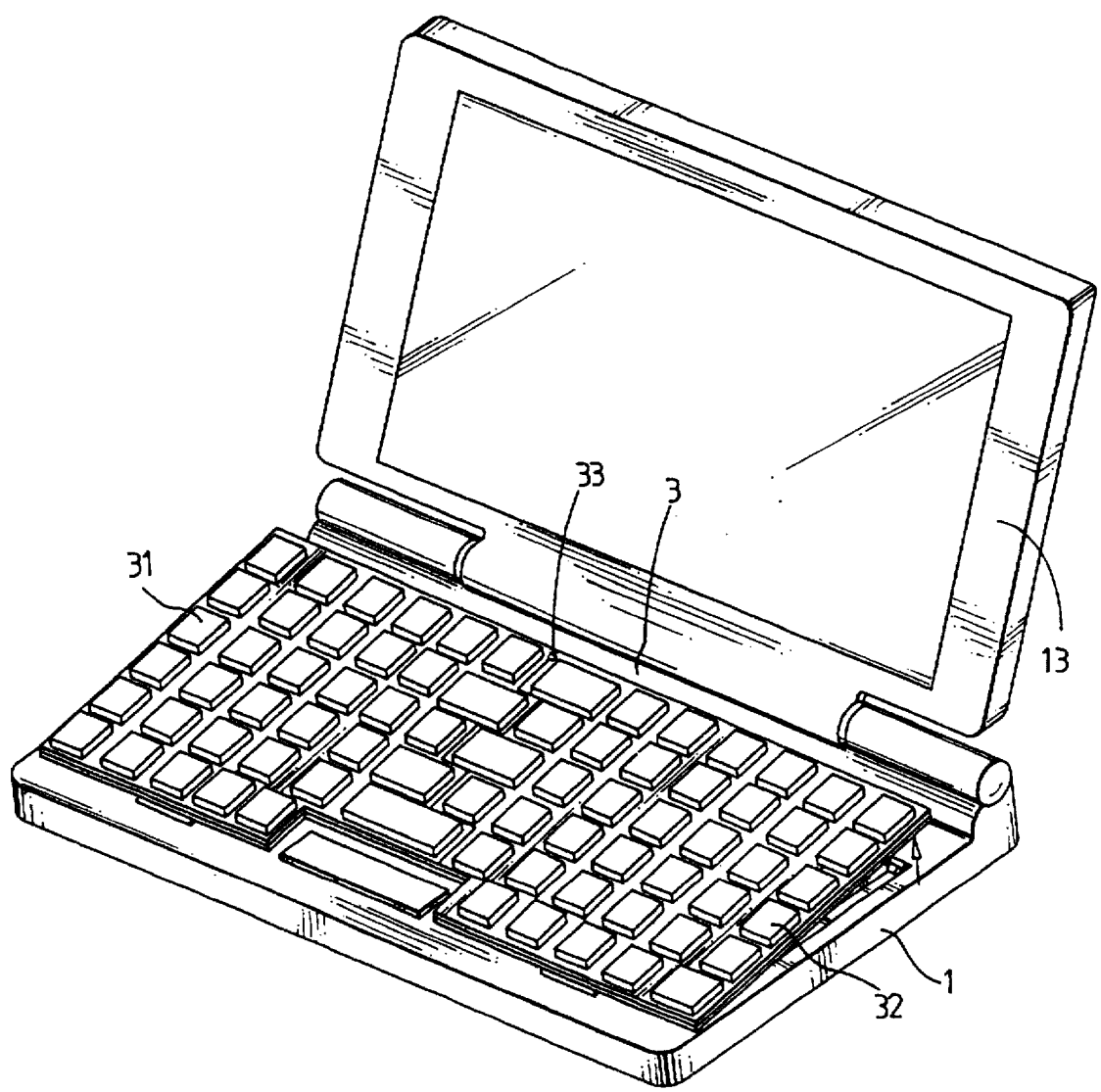
FIG. 5 is a view according to FIG. 4, in which the keyboard is forward and upward inclined.

Referring to FIG. 5, in use, the pushing section 122 is pushed by a hand to make the engaging projection 121 of the engaging plate 12 separated from the upper side of the pad board 2. At this time, the pad board 2 is in a loosened state. The supporting crank 23 is rotated by the resilient torque of the torque spring 22 and the guide wheel 24 is rolled from one end of the slide channel 11 to the other end. The position of the crank seat 21 is displaced from the middle point of the slide channel 11 so that when the guide wheel 24 is rolled to the other end of the slide channel 11, the rear side of the pad board 2 is lifted with the pad board 2 pivoted about the pivot members 20 of the front side thereof. Therefore, the pad board 2 is upward and forward inclined and the keyboard 3 rested on the pad board 2 is also upward and forward inclined to meet the configuration of the human body so as to facilitate the operation of tho hands and achieve an optimal sight.

Figure 6:
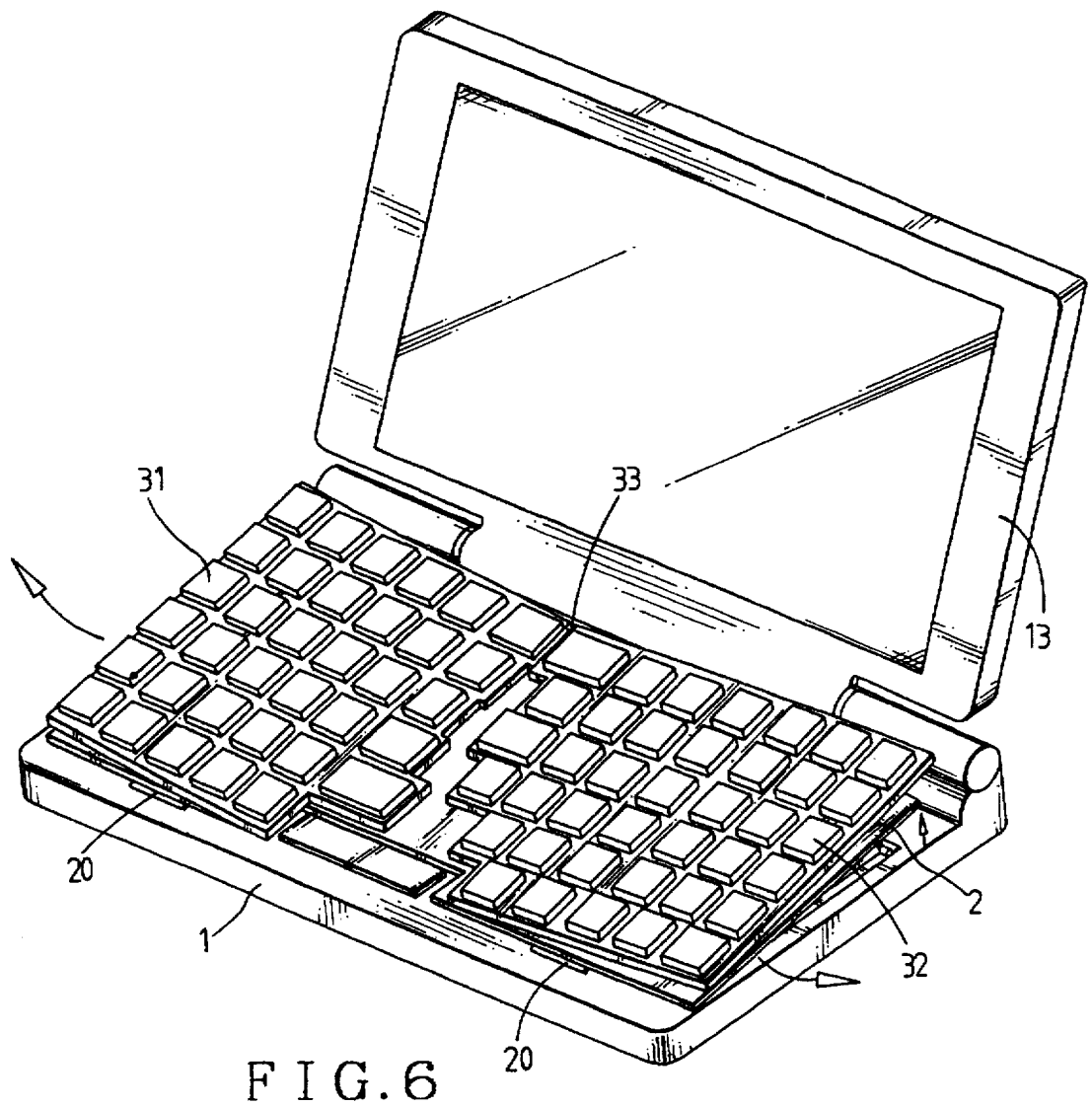
FIG. 6 shows that the keyboard is divided into two keyboard divisions which can be pivoted outward apart.

Referring to FIG. 6, the keyboard 3 can be divided into two lateral keyboard divisions 31, 32. The top edges of the adjacent sides of the keyboard divisions 31, 32 are pivotally disposed on the pad board 2, whereby when the keyboard 3 is inclined, the bottom ends thereof are pivoted and stretched to two sides to meet the extension angle of the hands of the operators.

It should be noted that the above description and accompanying drawings are only used to illustrate one embodiment of the present invention, not intended to limit the scope thereof. Any modification of the embodiment should fall within the scope of the present invention.

What is claimed is:

1. A keyboard structure of a portable computer, comprising:
   a base seat;
   a pad board having supporting cranks pivotally disposed on two sides thereof, the free end of each supporting crank being slidably positioned on the base seat, the front edge of the pad board being pivotally connected near the front edge of the base seat by pivot members;
   a keyboard disposed on the pad board, whereby when rotating the supporting cranks, the rear end of the pad board is forward and upward lifted by an inclination angle.

2. A keyboard structure as claimed in claim 1, wherein a resilient engaging plate is disposed on the base seat near the front edge of the pad board for engaging with the pad board when collected, a torque spring being disposed at the pivot portion between the supporting crank and the pad board for rotating the supporting crank to lift the pad board.

3. A keyboard structure as claimed in claim 1, wherein the base seat is formed with slide channels corresponding to the supporting cranks for the free ends thereof to slidably extend in.

4. A keyboard structure as claimed in claim 1, wherein the free end of the supporting crank is disposed with a guide wheel.

5. A keyboard structure as claimed in claim 2, wherein the free end of the supporting crank is disposed with a guide wheel.

6. A keyboard structure as claimed in claim 3, wherein the free end of the supporting crank is disposed with a guide wheel.

7. A keyboard structure as claimed in claim 1, wherein the engaging plate is disposed with an engaging projection for engaging with the pad board, a pushing section extending from upper side of the engaging projection for easy pushing.

* * * * *